Aug. 24, 1948.    R. J. WAREING    2,447,970
APPARATUS FOR COOLING OR ATTEMPERATING
OIL OR OTHER LIQUID
Filed May 1, 1944
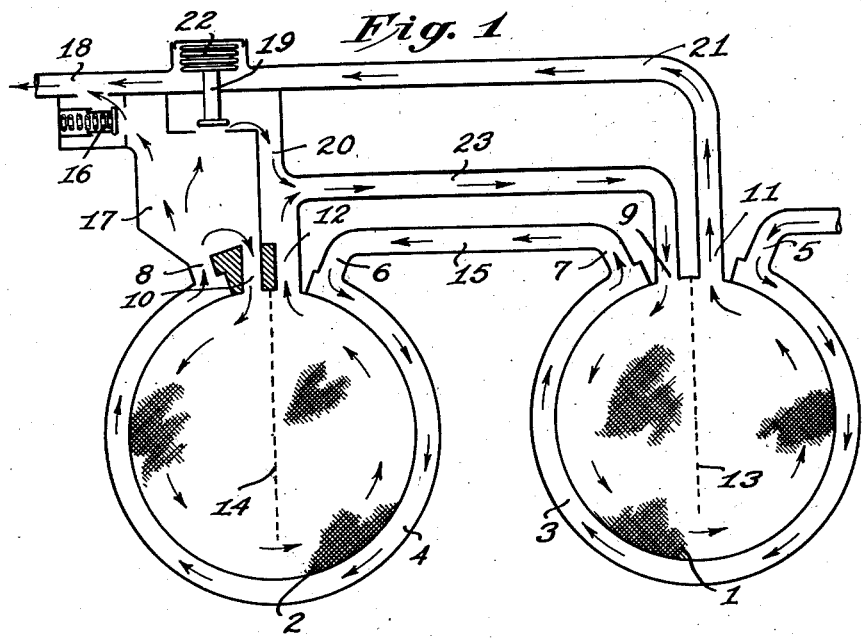
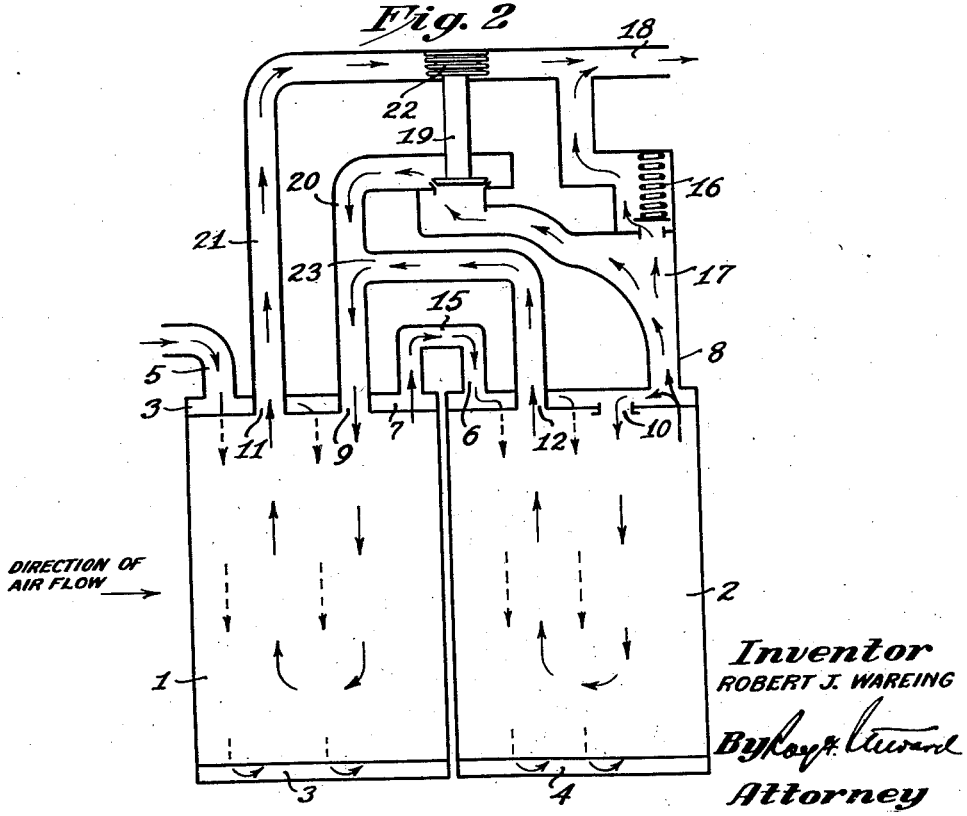
Inventor
ROBERT J. WAREING Patented Aug. 24, 1948

2,447,970

UNITED STATES PATENT OFFICE 2,447,970

APPARATUS FOR COOLING OR ATTEMPERATING OIL OR OTHER LIQUID

Robert J. Wareing, Birmingham, England, assignor to Imperial Chemical Industries Limited, a corporation of Great Britain Application May 1, 1944, Serial No. 533,492
In Great Britain May 28, 1940

1 Claim. (Cl. 257—2)

This invention relates to oil or other liquid cooling devices and temperature regulators associated therewith and more particularly to such devices having one or more by-pass passages with associated automatically operated valves adapted to control the degree of cooling.

Usually in devices of this kind the hot oil or other liquid is conveyed under pressure through a matrix or matrices for cooling purposes and in the event of an excessive back pressure being set up due to over-cooling, all or a portion of the hot liquid is diverted through a conduit controlled by an automatic thermal or pressure valve and so by-passes the cooling matrix or matrices. The earlier devices of this kind were not entirely satisfactory in some applications, e. g. when used for cooling oil for aircraft engines, in that when the by-pass came into operation, the flow of oil through the matrix was reduced to the extent that the oil became congealed, and consequently ceased to flow altogether. In later devices attempts were made to overcome this difficulty by forming the by-pass conduit within or around the cooling matrix so that when the by-pass came into operation a certain amount of heat was conducted from the hot oil in the by-pass to the cold oil in the adjacent cooling matrix. Such attempts, however, have not been completely successful in overcoming the difficulty of rapidly freeing the cooler of congealed oil nor of preventing local congealing of the oil in portions of the matrix even when the oil is not by-passing the matrix, especially under conditions of operation where extremely low temperatures are encountered.

The object of our invention is to provide an improved cooling device of the kind described which will be reliable in operation and which will be free from the disadvantages referred to. A further object of our invention is to provide a cooling device in which the degree of cooling is accurately controlled.

According to our invention, in a cooling device of the kind described and having a conduit or conduits surrounding substantially the whole of that part of the outer surface of the cooling matrix or matrices which is substantially parallel to the direction of the cooling passages and/or extending within the said matrix or matrices for substantially the whole length thereof, all the hot fluid is caused to flow through the whole of the conduit or conduits before gaining access to the said matrix or matrices and to the associated by-pass channels or chambers irrespective of whether or not the fluid is by-passing the matrix or matrices. The conduit may take the form of a jacket or jackets surrounding the matrix or matrices, the hot fluid being circulated through the jacket or jackets before entering the said matrix or matrices. By this means the oil or other fluid in the portion of the matrix adjacent the jacket or conduit is warmed by the hot incoming fluid and is prevented from congealing in this part of the said matrix, irrespective of whether or not the by-pass device is in operation.

Preferably the cooling device comprises a plurality of matrices with separate jackets. The hot fluid may flow through the jackets in series before entering any one of the matrices. In such a multi-stage cooling device, flow through the matrices and by-pass channels is determined by one or more pressure-controlled or temperature-controlled valves, or by a combination of such valves. In a two-stage cooling device in which the hot fluid flows through the jackets in series and in which the flow through the matrices and by-pass passages is determined by a combination of pressure-controlled and temperature-controlled valves, the arrangement is preferably such that the pressure-controlled valve is adapted to by-pass hot fluid from the inlet connection of the matrix of the first stage to the outlet conduit from the second stage of the cooler, and the temperature-controlled valve is designed to provide accurate control of the temperature of the fluid leaving the cooler by regulating the flow of fluid through a by-pass conduit or chamber connecting the inlets to the two matrices.

One method of carrying our invention into effect is illustrated in the accompanying drawings, wherein Fig. 1 illustrates diagrammatically a two-stage oil cooler according to the invention, the two elements of the cooler being shown in side by side relationship for the sake of clarity; and Fig. 2, which is also diagrammatic, shows these elements placed end to end, as is usually most desirable in practice.

Referring to the drawings, cooling matrices 1 and 2, each comprising a number of thin-walled metal tubes arranged in honeycomb formation within a suitable casing, are each provided with jackets 3 and 4 respectively, disposed on the outside of the said casings. Oil inlet ports 5 and 6 and oil outlet ports 7 and 8 are provided in the jackets 3 and 4 respectively, the outlet port 7 being connected to the inlet port 6 by a pipe or passageway 15. Oil inlet ports 9 and 10 and outlet ports 11 and 12 are provided in the cooling matrices 1 and 2 respectively and internal baffles 13 and 14 are fitted in the matrices 1 and 2 as shown to impart a circuitous path to the oil.

The oil to be cooled or attemperated enters by the port 5 into the jacket 3 and after flowing through the said jacket leaves by the outlet port 7. From thence it flows through the pipe or passageway 15 to the inlet port 6 of the jacket 4 and after flowing through the jacket leaves by the outlet port 8. The subsequent path of the oil stream is determined by the temperature and pressure of the oil in the matrices 1 and 2. If the oil in the matrices is cold, and therefore exerts a back pressure or resistance to flow therethrough, a pressure responsive valve 16 opens, allowing all or a greater part of the oil to pass from the chamber 17 directly into the outlet pipe 18. As the oil in the matrices warms up by conduction of heat from the hot oil circulating through the jackets 3 and 4, the resistance to flow of oil through the said matrices falls, the pressure responsive valve 16 closes, and the bulk of the oil then passes from the chamber 17 through a thermostatically controlled valve 19 into a pipe or passageway 20, and thence through the inlet 9 into the matrix 1, thus by-passing the matrix 2. From the matrix 1 the oil leaves through the port 11 into the pipe or passageway 21 and passes from there to the oil outlet 18.

The thermostatic valve 19 is controlled in known manner by a bellows device 22 situated in the passageway 21 to provide accurate control of the temperature of the oil leaving the cooler. When the oil passing through the said conduit has attained a sufficiently high temperature, the bellows expand and operate to close the valve 19. On the closing of this valve the oil from the chamber 17 is forced to pass through the port 10 into the matrix 2, through the said matrix 2, via the outlet port 12 and passageway 23 into the matrix 1 and finally into the oil outlet 18. It will be observed that by this arrangement of valves and passages the oil may be by-passed from the jackets direct to the oil outlet, or may pass through one or both of the matrices, the path of the oil stream being automatically controlled by its own temperature and pressure.

In the arrangement shown in Fig. 2, the incoming cooling air flows through the matrix 1 and thence through the matrix 2. It will thus be seen that the matrix 1 is subjected to the coldest air but the oil therein adjacent to the jacket is warmed by the hot incoming oil in the said jacket to the greatest extent and is thus prevented from congealing and free passage of oil within the said matrix is thus ensured.

If desired, in addition to the provision of temperature-regulating means in the form of pressure-controlled and/or temperature-controlled by-pass valves, control of the oil temperature may be attained by controlling the flow of cooling air through the matrix or matrices by means of shutters or louvres actuated manually, or automatically by means of temperature and/or pressure controlled devices.

While we have described an oil cooling device having a warming conduit or jacket surrounding the cooling matrix, it will be understood that the conduit may take the form of an internal passage or passages extending substantially the whole length of the matrix. Such internal passage or passages may, if desired, be employed in conjunction with an external jacket.

I claim:

A cooling device of the kind described, comprising cooling matrices providing a two-stage cooler, each comprising a plurality of thin-walled metal tubes disposed in honeycomb formation within a suitable casing having an external jacket, each of said matrices and said jackets having an inlet and an outlet, connections whereby hot fluid entering the inlet of one of said jackets flows through both jackets in series to the first-stage matrix inlet, a conduit connecting the first-stage matrix outlet to the second-stage matrix inlet, an outlet conduit for fluid leaving the second-stage matrix outlet, a by-pass conduit connecting the inlets of said matrices, a temperature-controlled valve in said by-pass conduit, thermostatic means operative upon sufficient rise in the temperature of fluid flowing through said outlet conduit, to cause said valve to reduce flow of fluid through said by-pass, a second by-pass conduit connecting the first-stage matrix inlet with the second-stage matrix outlet conduit, and a pressure-controlled valve normally closing said second by-pass conduit but arranged to open the same upon development of sufficient fluid pressure in that portion of said conduit between said pressure-controlled valve and said first-stage matrix inlet.

ROBERT J. WAREING.

REFERENCES CITED

The following references are of record in the file of this patent:

UNITED STATES PATENTS

| Number | Name | Date |
|---|---|---|
| 2,071,106 | Blair | Feb. 16, 1937 |
| 2,223,655 | Askin | Dec. 3, 1940 |
| 2,352,704 | Garner | July 4, 1944 |
| 2,354,362 | Burns | July 25, 1944 |
| 2,244,641 | Fedders | June 3, 1941 |

FOREIGN PATENTS

| Number | Country | Date |
|---|---|---|
| 102,385 | Switzerland | Nov. 16, 1923 |
| 460,047 | Great Britain | Jan. 20, 1937 |